(12) United States Patent
Raghav et al.

(10) Patent No.: US 7,899,168 B2
(45) Date of Patent: Mar. 1, 2011

(54) CONTROLLING OR MONITORING PBX PHONE FROM MULTIPLE PC ENDPOINTS

(75) Inventors: Amritansh Raghav, Seattle, WA (US);
Ankur Chavda, Seattle, WA (US);
Danny Levin, Redmond, WA (US);
Nikhil P. Bobde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/218,021

(22) Filed: Aug. 31, 2005

(65) Prior Publication Data

US 2007/0064672 A1 Mar. 22, 2007

(51) Int. Cl.
*H04M 3/42* (2006.01)
(52) U.S. Cl. .................. 379/201.01; 379/207.02; 379/207.11; 370/351
(58) Field of Classification Search ............ 379/201.01, 379/207.02, 207.11; 370/351
See application file for complete search history.

(56) References Cited

U.S. PATENT DOCUMENTS

| | | | |
|---|---|---|---|
| 2003/0217098 A1* | 11/2003 | Bobde et al. | 709/202 |
| 2004/0205192 A1 | 10/2004 | Olson et al. | |
| 2005/0123117 A1* | 6/2005 | Stockdale | 379/207.02 |

OTHER PUBLICATIONS

Internet Engineering Working Group (IETF) Network Working Group, Request for Comments: 3261, 268 pages; http://www.ietf.org/rfc/rfc3261.txt?number=3261, Jun. 2002.
ECMA International; Technical Report ECMA TR/87; 1st Edition; Jun. 2004; Using CSTA for SIP Phone User Agents (uaCSTA); 77 pages.
Standard ECMA-326, Standardizing Information and Communication Systems, Jun. 2001.

* cited by examiner

*Primary Examiner*—Vivian Chin
*Assistant Examiner*—Paul Kim

(57) ABSTRACT

A method for controlling or monitoring a common PBX phone line from a plurality of personal computer endpoints with multiple instances of application of a SIP soft phone application.

20 Claims, 6 Drawing Sheets

CONTROLLING OR MONITORING PBX PHONE FROM MULTIPLE PC ENDPOINTS

BACKGROUND

The Session Initiation Protocol (SIP) is a signaling protocol that provides a mechanism for a computing device to locate another device it wants to communicate with over a computer network and to establish a communication session therewith. In particular, SIP is an Internet Engineering Task Force (IETF) standard protocol for initiating interactive user-sessions in a number of scenarios. For example, SIP is used for Internet conferencing, telephony, gaming, virtual reality, event notification, and instant messaging. The SIP protocol enables call setup initiation, routing, authentication and other feature messages to endpoints within an internet protocol (IP) domain.

Like HTTP or SMTP, SIP works in the Application Layer of the Open Systems Interconnection (OSI) communications model. As such, SIP can establish multimedia sessions or Internet telephony calls, and modify or terminate them. The SIP protocol can also invite participants to unicast or multicast sessions that do not necessarily involve the initiator. Because the SIP supports name mapping and redirection services, users initiate and receive communications and services from any location and networks are capable of identifying users within the network.

A soft phone application is a SIP user agent (UA) which may be hosted by a home server; the soft phone application may provide an interface to telephony services. The application may act as an ECMA (European Computer Manufacturers Association) computing application which uses services from an ECMA switching system (PBX).

SUMMARY

A method for monitoring a common PBX phone line from a plurality of personal computer endpoints includes registering for a single user multiple instances of application of a soft phone application running on multiple personal computer endpoints. Each instance of application is registered for a common PBX phone line under control of a SIP/ECMA server. A first instance of application establishes a first SIP dialog with the SIP/ECMA server. A second instance of application establishes a second SIP dialog with the SIP/ECMA server simultaneously with the first SIP dialog. The method includes monitoring the status of the common PBX phone line simultaneously with the first instance of application and the second instance of application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
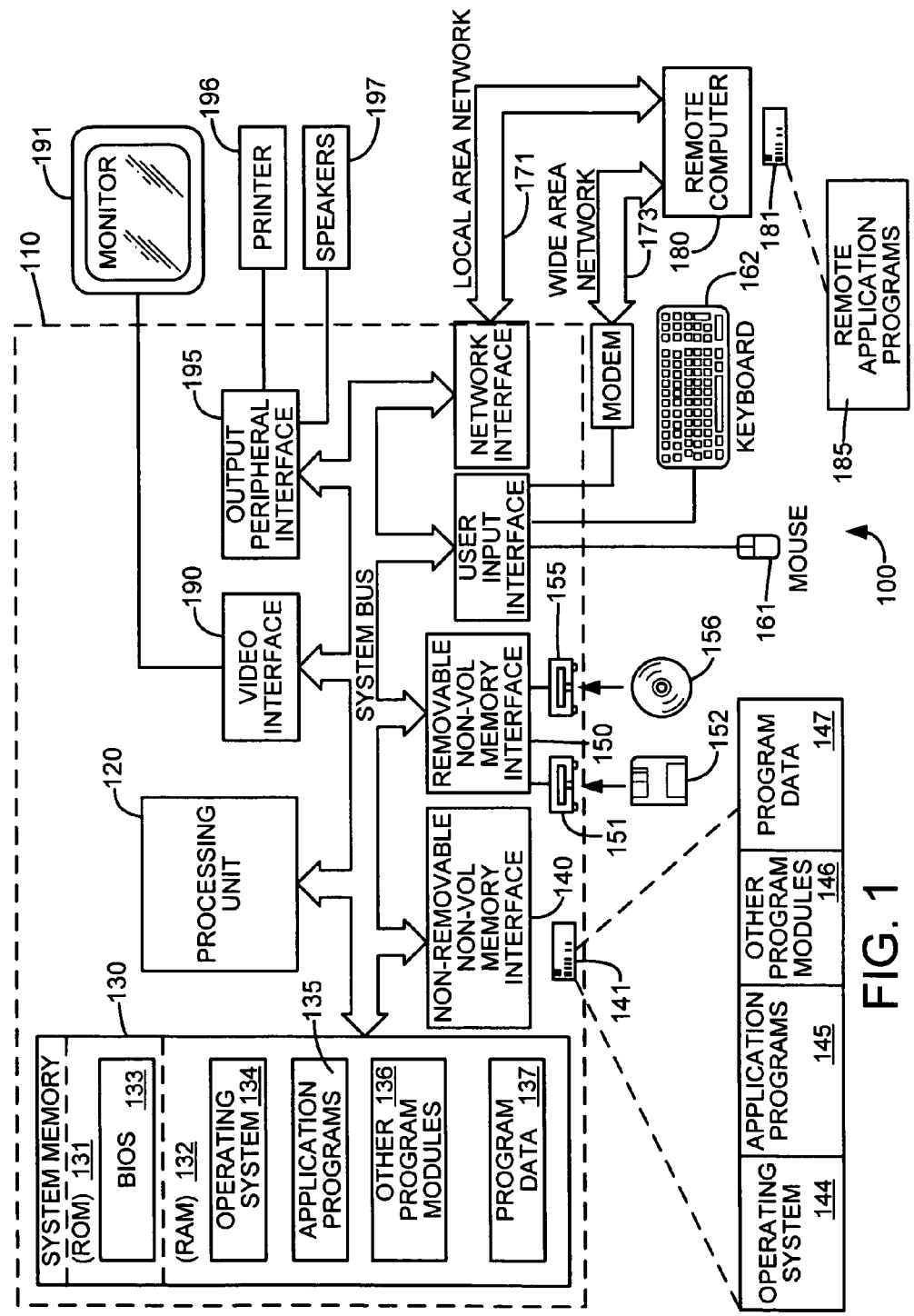
FIG. 1 is a schematic diagram illustrating an example of a computing system environment.

In the following detailed description and in the several figures of the drawing, like elements are identified with like reference numerals. The figures are not to scale, and relative feature sizes may be exaggerated for illustrative purposes.

Turning to the drawings, exemplary embodiments are illustrated as being implemented in a suitable computing environment. Although not required, the embodiments will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the features of the embodiments may be practiced with other computer system configurations, including hand-held devices, multi-processor systems, microprocessor-based or programmable consumer electronics, network PCs, minicomputers, mainframe computers, and the like. Embodiments of the invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing embodiments of the invention, which will be described in greater detail with reference to FIGS. 2-4B. Turning now to FIG. 1, an example is illustrated of a suitable computing system environment 100 on which embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention may be operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155. that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
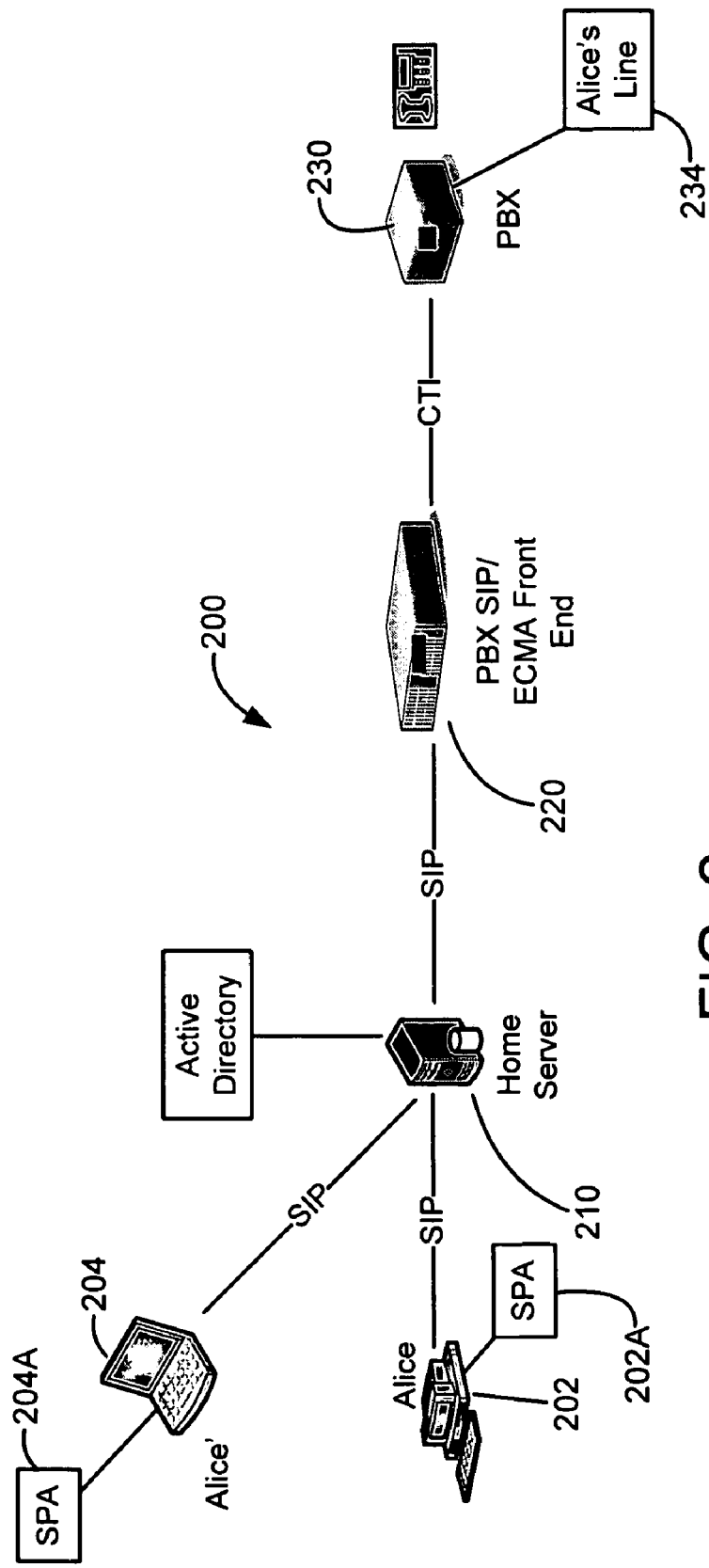
FIG. 2 illustrates an exemplary embodiment of an architecture of a suitable operating environment for soft phone application control of a PBX phone.

FIG. 2 illustrates an exemplary embodiment of an architecture of a suitable operating environment 200 for soft phone application control of an IP/PBX (Internet Protocol Private Branch exchange (IP PBX) or PBX phone,. telephone switching equipment 220, 230. In a typical implementation, the PBX equipment sends voice transmissions as data packets, and is installed in a business or other private or public entity. An IP PBX provides dial tone to PBX phone lines, and typically provides features such as conference and call transfer. In an exemplary embodiment, ECMA standard 269 (ECMA-269), $6^{th}$ Edition, June 2004, implements the application interface for telephony services. This interface enables a soft phone application (a computing application) (SPA) 202A on device 202, for example, Alice's personal computer, to monitor and control a PBX phone line assigned to Alice. In an exemplary embodiment, ECMA-323, $3^{rd}$ Edition, June 2004, may be used to define the XML schema for those services. These standards describe protocols which may be used in one exemplary embodiment. Other protocols having the functionality to allow a soft phone application to monitor and control a PBX phone line may alternatively be employed.

SIP implements the network protocol. ECMA-323 XML messages are tunneled in SIP messages (INVITE and INFO). The soft phone application and the PBX SIP/ECMA front end (FE) 220, which terminate the defined interface, are SIP user agents (UAs). As with any SIP architecture, the protocol primitives can traverse SIP proxies. As a result, these intermediates can act on behalf of the SIP UAs and inject any required policies, such as authentication.

SIP establishes a transport channel and an association between the computing application (SPA 202A) on device 202 and the switching system. The computing application is a soft phone application on behalf of a user (e.g., Alice) and the switching system is a PBX phone's line. The logical name of the user is described in the SIP From header while the PBX phone's line is described in the SIP To header.

ECMA-323 uses a device ID to identify a specific line. This device ID is associated with the SIP From and To headers via a provisioned database. Each line is provisioned with a SIP URI (used in the To header), a device ID (used in ECMA-323, when applicable in a service request) and an owner (used in the From header).

For example a SIP From header is sip:alice@userdomain.com, a SIP To header is sip:+14257777777@phonedomain.com and a device ID is tel:+14257777777. The home server 210 authenticates Alice, using Alice's credentials on a home server 210 while the PBX SIP/ECMA Front End 220 authorizes the ECMA-323 request, using a provisioned database, that holds the association between a phone line (Tel URI) (an example line is depicted as Alice's phone line 234 in FIG. 2), the phone line's SIP/ECMA front end address of record and the phone line's owner (SIP URI-LCS address).

The same user, e.g. Alice, may run multiple soft phone applications on different devices. For example, Alice may have another device (Alice') 204, e.g. a mobile phone or a laptop computer, connected to the home server 210. The device 204 may be running a second instance of application of the soft phone application 204A. SIP establishes a transport channel and an association between the computing application (SPA 204A) on device 204 and the switching system.

In an exemplary embodiment, Alice may monitor and control her assigned PBX line using SPA 202A running on device 202 and/or using SPA 204A running on device 204. For example, Alice could receive a call while working at device 202, transfer the call to device 204 e.g. in an other room, complete the call on device 204, and terminate the call on device 204, clearing the phone line connection. An exemplary flow diagram illustrates features of the embodiment in FIG. 2A.

Figure 2A:
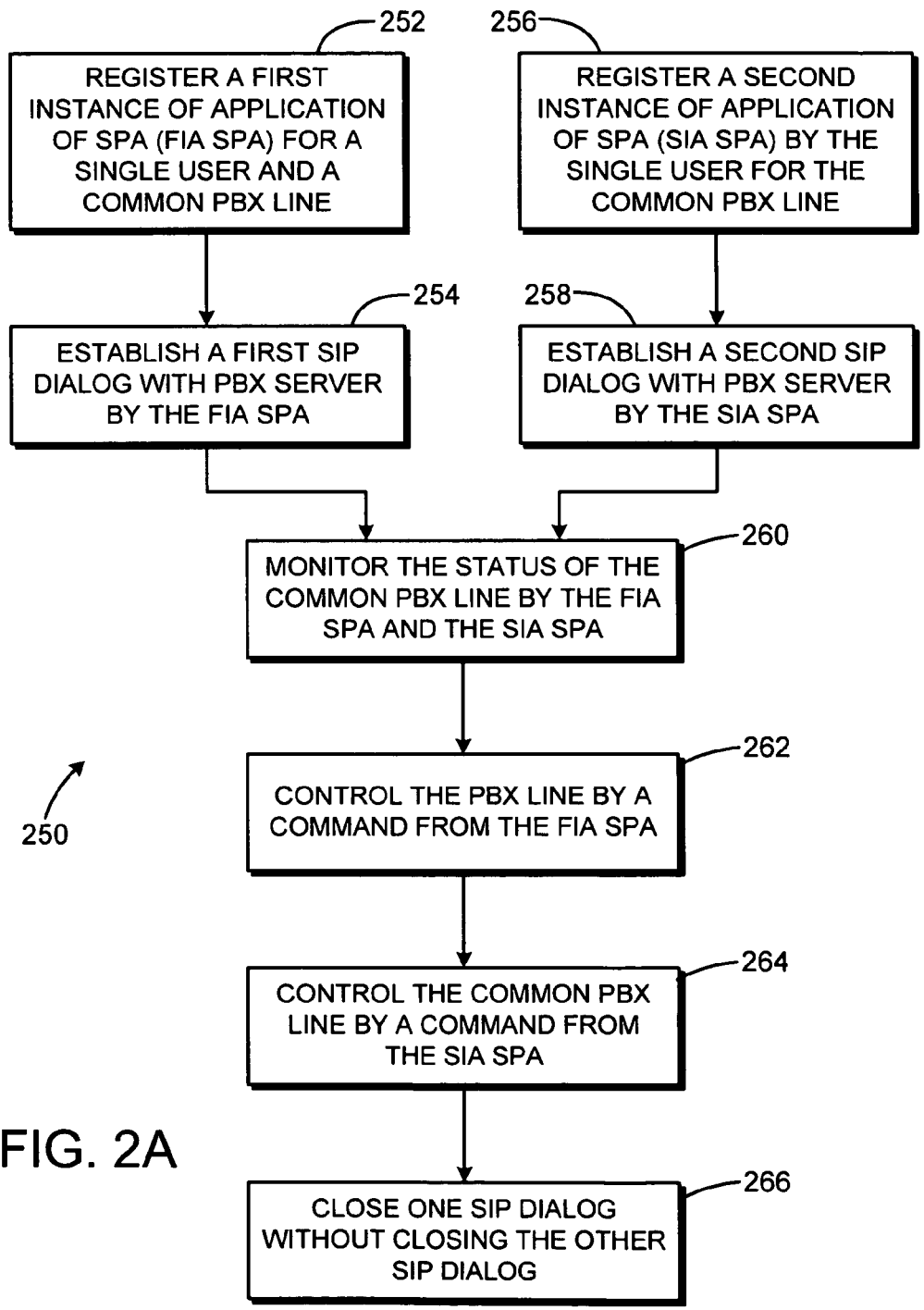
FIG. 2A is an exemplary flow diagram of an exemplary embodiment of a method for controlling a common PBX phone line by instances of application of a soft phone application running on multiple personal computer end points.

An exemplary method 250 is illustrated in FIG. 2A. At step 252, a first instance of application of a soft phone application (e.g. SPA 202A running on device 202) is registered for a single user (e.g. Alice). At 254, the SPA 202A established a SIP dialog with the PBX server (e.g. PBX Front End 220). At 256, the second instance of application of the soft phone application of the same user (e.g. SPA 204A running on device 204) is registered for the same user. At 258, the second SPA establishes a second SIP dialog with the PBX server. It will be understood that steps 256, 258 are not necessarily sequential in time to steps 252, 254. However, at some point, the first and second SIP dialogs are running simultaneously. At 260, the first and second SPAs are simultaneously monitoring the status of the common PBX line. This allows both SPA 202A and SPA 204A to see the status of the PBX line. Each instance of application of the SPA may also control the PBX line, using SIP commands, and this is illustrated by steps 262, 264. For example, SPA 202A may answer an incoming call at 262, and SPA 204A may terminate the call at 264. Other commands may alternatively be issued by either SPA. Each of the SIP dialogs may be terminated independently of the other SIP dialog, as illustrated at 266.

Figure 3:
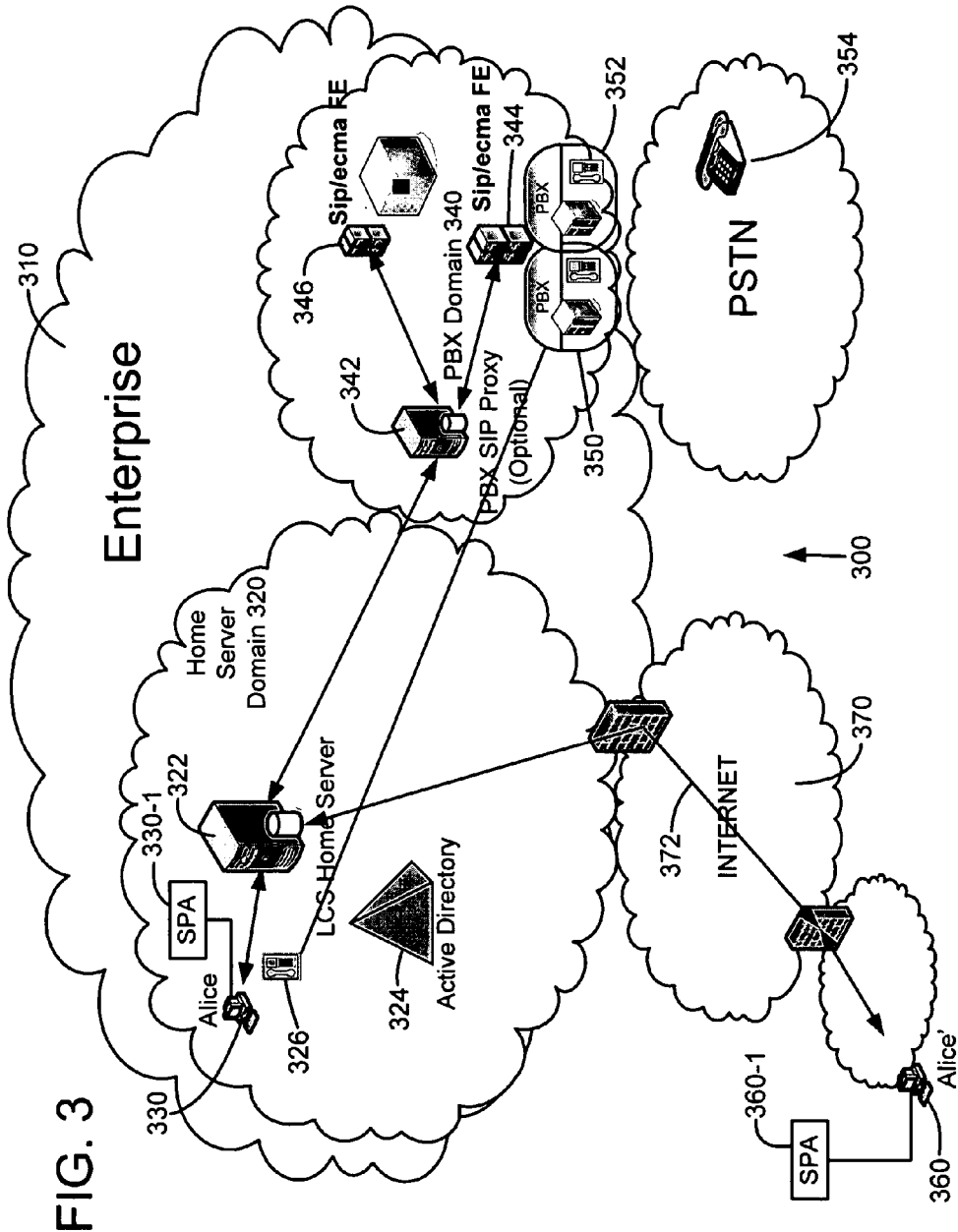
FIG. 3 is a schematic depiction of an exemplary embodiment of a suitable operating environment for control of a PBX phone by multiple instances of a user's soft phone application.

To further illustrate features of embodiments of the invention, FIG. 3 is a schematic depiction of an exemplary alternate embodiment of a suitable operating environment 300 in which embodiments of the invention may be implemented. The operating environment is only one example of a suitable operating environment and is not intended to suggest any limitation as to the scope of use or functionality of embodiments of the invention. Other well known computing systems, environments, and/or configurations that may be suitable for use with embodiments of the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The enterprise represented by cloud 310 includes a home server domain 320. The home server domain 320 includes a home server 322, which may be implemented in one exemplary embodiment by a Live Communication Server (LCS) system by Microsoft Corporation, and an Active Directory 324. While theoretically the Active Directory (AD) could be run on the same machine as the home server, it is typically on a different machine. The home server domain further includes a computing device 330 such as a personal computer, for example, connected on a local area network (LAN) to the home server 322.

The enterprise 310 also includes a PBX domain 340, which may include an optional PBX SIP proxy 342, which hosts several SIP/ECMA servers, e.g. SIP/ECMA front end (FE) 344 for PBX 350 and SIP/ECMA FE 346 for PBX 352. In general there may be a one to one relationship between a ECMA front end and a PBX, or one ECMA front end to many PBXs. The relation between the FE and the PBX may be a proprietary CTI link. The proxy server 342 may be the core of a SIP IP PBX or can be used just to proxy the SIP/ECMA servers, e.g., to simplify routing and proxy authorization. The PBX domain may include hard phones, e.g. PSTN hard phone 354.

The home server domain 320 may optionally also include a hard phone 326 connected directly to a PBX 350, as depicted in FIG. 3.

The same user, e.g. Alice, may run multiple soft phone applications on different devices. For example, Alice may have another device 360, e.g. a mobile phone or a laptop computer, connected over the internet 370 to the home server via an internet connection depicted as link 372.

A soft phone application (SPA) is a SIP user agent (UA) which is hosted by a home server; the soft phone application may provide an interface to telephony services. In an exemplary embodiment, the SPA acts as an ECMA computing application, which uses services from the ECMA switching system (PBX). An exemplary soft phone application is implemented by the Microsoft Office Communicator 2005 product from Microsoft Corporation. The SIP/ECMA server implements a SIP UA which is hosted by a different (i.e. that of the PBX) SIP domain. The interface between SIP/ECMA server and the PBX can be ECMA or any proprietary CTI protocol. The SIP interface between PBX domain and the home server domain may be secured by Mutual Transport Layer Security (TLS).

Each user may run multiple soft phone applications simultaneously on different devices. For example, in FIG. 3, user Alice is running a personal computer 330 with an instance of application of the soft phone application (330-1), and a laptop computer device 360 with a second instance of application of the soft phone application (360-1). Each instance of application registers with the same Identity (such as sip:alice@microsoft.com). The registration is with the Home server 322. The Active directory 324 is typically used to provision static settings and policy for each user. The SIP protocol permits a single user to register multiple devices, as described, for example, in the IETF Request for Comment (RFC) 3261, http:www.ieff.org/rfc/rfc3261, June 2002. The registration is used to bind a SIP address of record, such as sip:alice@ms.com with a local IP address (FQDN) of the machine (PC). A technique described in U.S. Publication 2004/0205192 may also be used.

After registration each instance of application may establish a SIP dialog with the SIP/ECMA server that is used to monitor and control the PBX phone's line assigned to the user Alice. The line is assigned to Alice by the specific telephony provisioning process in a given application. For example when a new employee joins a company, which has an installed PBX system, part of the process would involve assigning a phone number and a line (the telephone jack in the actual office in which the employee will sit). The information of which line is assigned to which user resides in the Active Directory 324; it is typically provisioned in the Active Directory and the PBX database. When a call is presented to the phone, (the phone rings), then an alerting event is sent to each instance of application that monitors the line and as a result, in an exemplary embodiment, an alerting popup screen may be presented to the user's device display. As a result the user may invoke control services from each instance such as, Answer Call or Deflect Call.

In an exemplary embodiment, the soft phone application, e.g. SPA 330-1, sends out a SIP INVITE message to the Gateway, i.e. the SIP/ECMA FE, when it wants to start monitoring a phone device. INVITE itself will try to get the status of the PBX and CTI link and Gateway status in order to figure out if a monitoring session can be created. The dialog that is created by the INVITE is used to control/monitor only a single line in an exemplary embodiment. On successful response, the soft phone application will then get the status of the phone line itself and then register for events with the Gateway. In an exemplary embodiment, all subsequent commands from the soft phone application to the Gateway are sent as a SIP INFO message with the actual ECMA command encoded as XML carried in the message body of the INFO. The command issued could change the state of the phone monitored. In that case a SIP INFO message is sent back to all the soft phone application clients currently having a connected INVITE session with the Gateway for monitoring this particular phone device. The Gateway will send the exact same state description to all the soft phone clients watching this phone, so that all of the user's PC endpoints running the soft phone application will have the same view of the phone state. This enables the user to control or monitor the phone from multiple PC endpoints simultaneously.

A sample SIP INVITE message sent to start the monitoring/controlling session with the SIP-CSTA Gateway is set out in Table 1. The phone extension being controlled is 29748.

TABLE 1

INVITE sip:29748@genesys-istanbul.rtcdev.nttest.microsoft.com SIP/2.0
Via: SIP/2.0/TCP 157.56.65.89:10348
Max-Forwards: 70
From: "prashm1"
<sip:prashm1@phonetest.rtmp.selfhost.corp.microsoft.com>;tag=29fc77be8556
412cae62e1214688dba7;epid=df721b36a9
To: <sip:29748@genesys-istanbul.rtcdev.nttest.microsoft.com>
Call-ID: 8339ca8be42140e3b7a7364b8efe5a79
CSeq: 1 INVITE
Contact:
<sip:prashm1@phonetest.rtmp.selfhost.corp.microsoft.com:10348;maddr=157.
56.65.89;transport=tcp>;proxy=replace
User-Agent: LCC/1.3
Supported: timer
Session-Expires: 1800;refresher=uac
Min-SE: 1800
Content-Disposition: signal;handling=required
Proxy-Authorization: Kerberos qop="auth", realm="SIP Communications
Service", opaque="872D0ED3", crand="a4f3d532", cnum="6",
targetname="sip/z03-lct.phonetest.rtmp.selfhost.corp.microsoft.com",
response="602306092a864886f71201020201011100ffffffffde70703033bc344b
dc9113b4f88e96d"

TABLE 1-continued

Content-Type: application/csta+xml
Content-Length: 327
<?xml version="1.0"?>
<RequestSystemStatus xmlns="http://www.ecma-international.org/standards/ecma-323/csta/ed3"><extensions><privateData><private><lcs:line xmlns:lcs="http://schemas.microsoft.com/Lcs/2005/04/RCCExtension">tel:29748;phone-context=intecom</lcs:line></private></privateData></extensions></RequestSystemStatus>
SIP/2.0 200 OK
Authentication-Info: Kerberos rspauth="602306092A864886F71201020201011100FFFFFFFF8BF6865D1DBF37E2FD4E946A550A479F", srand="71944DA9", snum="8", opaque="872D0ED3", qop="auth", targetname="sip/z03-lct.phonetest.rtmp.selfhost.corp.microsoft.com", realm="SIP Communications Service"
Record-Route: <sip:z03-lct.phonetest.rtmp.selfhost.corp.microsoft.com;transport=tcp;lr;ms-route-sig=baz-uc7ry1hKi9a4KU1cLCPLVyjgJJ>
Via: SIP/2.0/TCP 157.56.65.89:10348;ms-received-port=3042;ms-received-cid=f200
From: "prashm1" <sip:prashm1@phonetest.rtmp.selfhost.corp.microsoft.com>;tag=29fc77be8556412cae62e1214688dba7;epid=df721b36a9
To: <sip:29748@genesys-istanbul.rtcdev.nttest.microsoft.com>;tag=8806FFAC-3795-4F61-A473-5545328207EE-408
Call-ID: 8339ca8be42140e3b7a7364b8efe5a79
CSeq: 1 INVITE
Contact: <sip:si05-lct.phonetest.rtmp.selfhost.corp.microsoft.com:5060;transport=tcp>
Session-Expires: 1800;refresher=uac
Min-SE: 1800
Require: timer
Supported: timer
Content-Type: application/csta+xml
Content-Length: 203
<?xml version="1.0" encoding="UTF-8"?>
<RequestSystemStatusResponse xmlns='http://www.ecma-international.org/standards/ecma-323/csta/ed3'><systemStatus>normal</systemStatus></RequestSystemStatusResponse>

Table 2 sets out a sample SIP INFO message as sent by the soft phone application to the SIP-CSTA Gateway in order to make a phone call from the controlled phone to the other phone number, 29768.

TABLE 2

INFO sip:z03-lct.phonetest.rtmp.selfhost.corp.microsoft.com;transport=tcp;lr;ms-route-sig=baz-uc7ry1hKi9a4KU1cLCPLVyjgJJ SIP/2.0
Via: SIP/2.0/TCP 157.56.65.89:10348
Max-Forwards: 70
From: "prashm1" <sip:prashm1@phonetest.rtmp.selfhost.corp.microsoft.com>;tag=29fc77be8556412cae62e1214688dba7;epid=df721b36a9
To: <sip:29748@genesys-istanbul.rtcdev.nttest.microsoft.com>;tag=8806FFAC-3795-4F61-A473-5545328207EE-408
Call-ID: 8339ca8be42140e3b7a7364b8efe5a79
CSeq: 6 INFO
Route: <sip:si05-lct.phonetest.rtmp.selfhost.corp.microsoft.com:5060;transport=tcp>
Contact: <sip:prashm1@phonetest.rtmp.selfhost.corp.microsoft.com:10348;maddr=157.56.65.89;transport=tcp>;proxy=replace
User-Agent: LCC/1.3
Content-Disposition: signal;handling=required
Proxy-Authorization: Kerberos qop="auth", realm="SIP Communications Service", opaque="872D0ED3", crand="8ba720e4", cnum="16", targetname="sip/z03-lct.phonetest.rtmp.selfhost.corp.microsoft.com", response="602306092a864886f71201020201011100ffffffff1d06d7aec69b3a414f0690e149eb9d14"
Content-Type: application/csta+xml
Content-Length: 298
<?xml version="1.0"?>

TABLE 2-continued

```
<MakeCall xmlns="http://www.ecma-international.org/standards/ecma-
323/csta/ed3"><callingDevice>tel:29748;phone-
context=intecom</callingDevice><calledDirectoryNumber>tel:29768;phone-
context=intecom</calledDirectoryNumber><autoOriginate>doNotPrompt</auto
Originate></MakeCall>
SIP/2.0 200 OK
Authentication-Info: Kerberos
rspauth="602306092A864886F71201020201011100FFFFFFFF672CD5630BE
9EAEA892BEAF31B69C05C", srand="63EBC81F", snum="18",
opaque="872D0ED3", qop="auth", targetname="sip/z03-
Ict.phonetest.rtmp.selfhost.corp.microsoft.com", realm="SIP Communications
Service"
Via: SIP/2.0/TCP 157.56.65.89:10348;ms-received-port=3042;ms-received-
cid=f200
From: "prashm1"
<sip:prashm1@phonetest.rtmp.selfhost.corp.microsoft.com>;tag=29fc77be8556
412cae62e1214688dba7;epid=df721b36a9
To: <sip:29748@genesys-istanbul.rtcdev.nttest.microsoft.com>;tag=8806FFAC-
3795-4F61-A473-5545328207EE-408
Call-ID: 8339ca8be42140e3b7a7364b8efe5a79
CSeq: 6 INFO
Content-Type: application/csta+xml
Content-Length: 248
<?xml version="1.0" encoding="UTF-8"?>
<MakeCallResponse xmlns='http://www.ecma-
international.org/standards/ecma-
323/csta/ed3'><callingDevice><callID>90</callID><deviceID>tel:29748;phone-
context=intecom</deviceID></callingDevice></MakeCallResponse>
```

Table 3 is a sample INFO message as sent by the SIP-CSTA Gateway to any soft phone application client which is currently having an INVITE session with the Gateway for monitoring the phone device identified by the device ID, 29748. The SIP INFO message sent to each client has the exact same message body. The SIP headers could be different based upon the routing information. This SIP INFO message informs the client about a call ringing on the phone being monitored.

TABLE 3

```
INFO
sip:prashm1@phonetest.rtmp.selfhost.corp.microsoft.com:3042;maddr=157.56.
65.89;transport=tcp;ms-received-cid=F200 SIP/2.0
Authentication-Info: Kerberos
rspauth="602306092A864886F71201020201011100FFFFFFFF750D9601B25A
FB929E001F7928136DD0", srand="098A45B6", snum="91",
opaque="872D0ED3", qop="auth", targetname="sip/z03-
Ict.phonetest.rtmp.selfhost.corp.microsoft.com", realm="SIP Communications
Service"
Via: SIP/2.0/TCP
172.29.104.120;branch=z9hG4bK8E8AABD6.C4EE6AAE;branched=FALSE;ms
-internal-info="daD6VpkTsVCPK6__4FGNmugQA0OM58A"
Max-Forwards: 70
Via: SIP/2.0/TCP 172.29.105.56:5060;branch=z9hG4bKFD5E823A-763F-491E-
8B62-A88192F76AC5-905;ms-received-port=1282;ms-received-cid=de00
From: <sip:29748@genesys-
istanbul.rtcdev.nttest.microsoft.com>;tag=8806FFAC-3795-4F61-A473-
5545328207EE-408
To: "prashm1"
<sip:prashm1@phonetest.rtmp.selfhost.corp.microsoft.com>;tag=29fc77be8556
412cae62e1214688dba7;epid=df721b36a9
Call-ID: 8339ca8be42140e3b7a7364b8efe5a79
CSeq: 33 INFO
Content-Length: 709
Content-Type: application/csta+xml
User-Agent: Genesys LCS Adapter/7.1.000.10;SIP Stack/7.1.000.03
<?xml version="1.0" encoding="UTF-8"?>
<DeliveredEvent xmlns='http://www.ecma-international.org/standards/ecma-
323/csta/ed3'><monitorCrossRefID>40</monitorCrossRefID><connection><call
ID>97</callID><deviceID>tel:29748;phone-
context=intecom</deviceID></connection><alertingDevice><deviceIdentifier>tel
:29748;phone-
context=intecom</deviceIdentifier></alertingDevice><callingDevice><deviceIde
ntifier>tel:29769;phone-
context=intecom</deviceIdentifier></callingDevice><calledDevice><deviceIdent
ifier>tel:29748;phone-
context=intecom</deviceIdentifier></calledDevice><lastRedirectionDevice><not
Required/></lastRedirectionDevice><localConnectionInfo>alerting</localConne
ctionInfo><cause>normal</cause></DeliveredEvent>
```

Figure 4A:
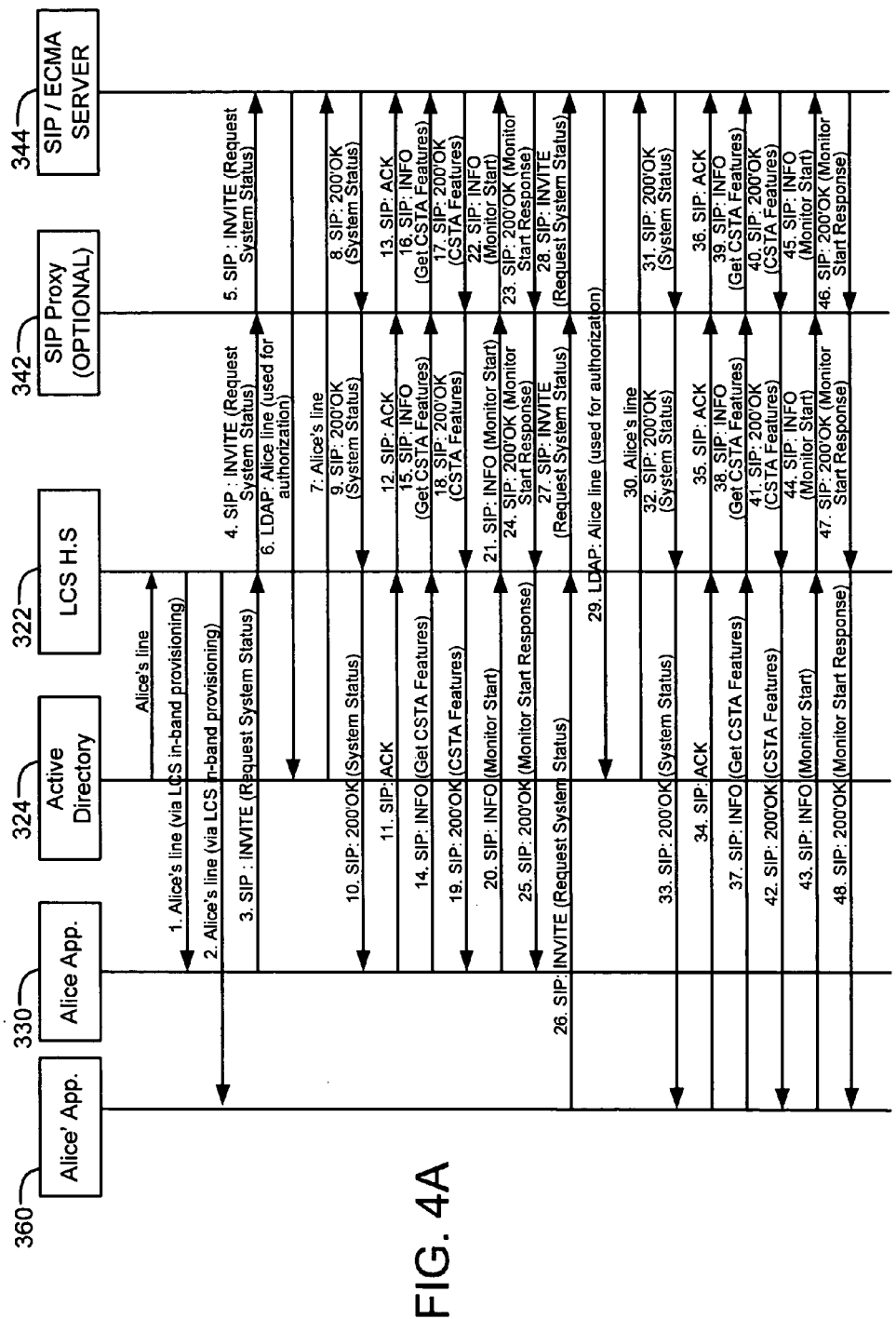
FIGS. 4A-4B are exemplary remote call flow diagrams, illustrating an exemplary embodiment of the monitoring and control of the PBX phone line by multiple instances of application.
Figure 4B:
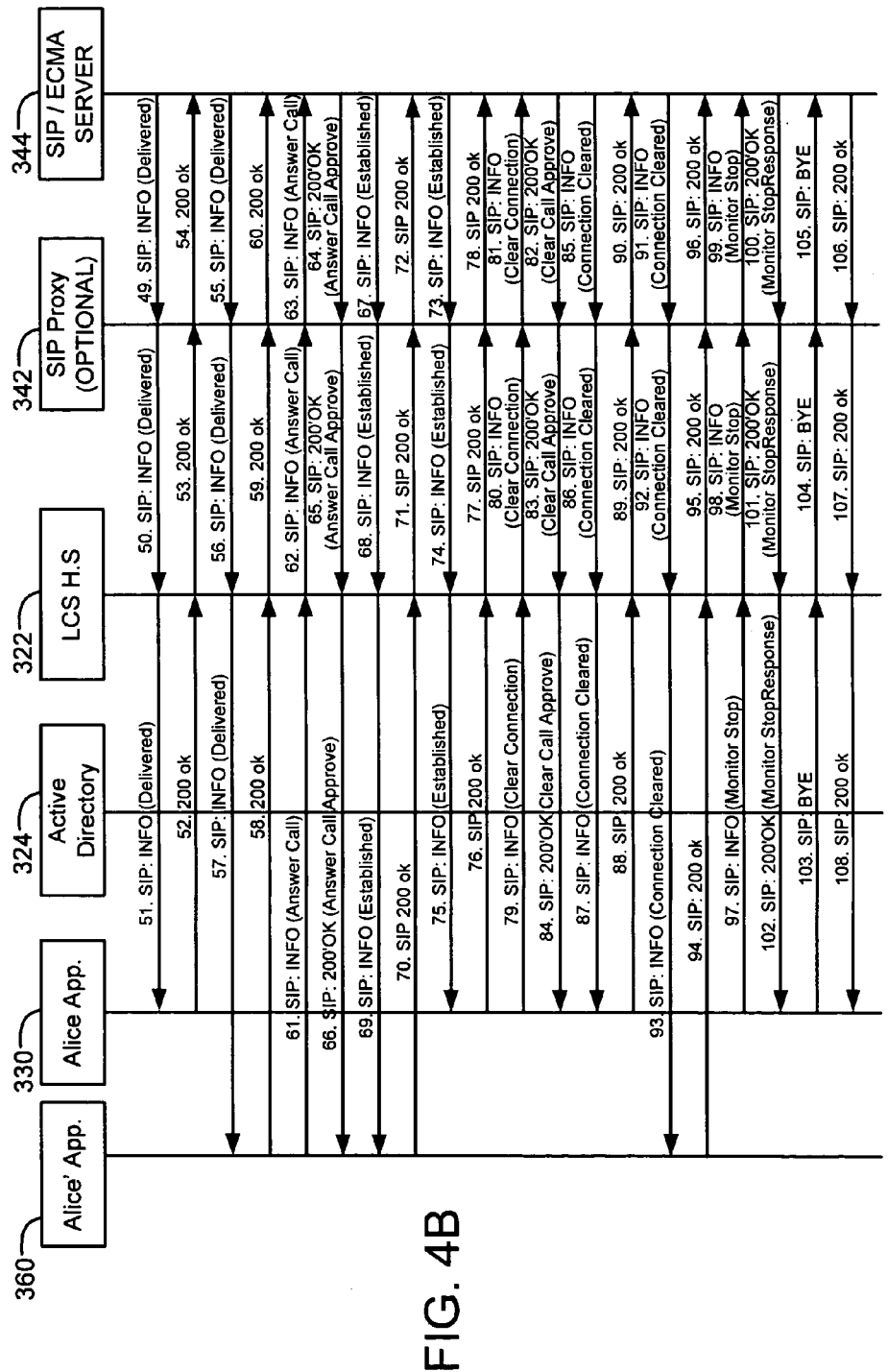

An exemplary method for monitoring and control of a PBX phone line by multiple instances of application in the exemplary environment of FIG. 3 is illustrated in the exemplary remote call flow diagrams of FIGS. 4A-4B. Initialization takes place in steps 1-48.

Steps 1-2: Application instances (Alice 330 and Alice' 360) "find" user's controlled lines. The soft applications get Remote Call Control line configuration parameters from the home server 322 via LCS in-band provisioning.

Steps 3-13: Application Service Association for instance Alice. The soft phone application sends a SIP INVITE message to each controlled phone's line that, in this exemplary embodiment, includes a Content-Disposition header indicating "signal" and "handling=required" to mandate support for the application/csta+xml MIME type. An ECMA-323 Request System Status service request is included in the SIP INVITE body with the Content-Type application/csta+xml. In this exemplary embodiment, the SIP INVITE message is propagated from the Alice application 330 to the home server 322 (step 3), from the home server to the SIP proxy 342 (step 4), and from the SIP proxy 342 to the SIP/ECMA server 344 (step 5).

A SIP 200 OK response, that includes ECMA-323 Request System Status response, may be sent back (steps 8-10).

If the PBX SIP/ECMA front end does not support this MIME type, it provides a 415 (Unsupported Media Type) response. A SIP dialog can be rejected due to other failure conditions, such as authorization. In this case an appropriate SIP response error message is sent instead of 200 OK at steps 8-10.

The soft phone application continues only if it receives a SIP 200 OK with a Request System Status response equal "Normal". Otherwise it closes the SIP dialog and notifies the user that the line cannot be accessed.

Steps 6-7: Authorization (Alice) The PBX ECMA front end authorizes a response to this INVITE request. There are several exemplary ways to authorize the request.

1. Local Information: The ECMA front end has information locally which says Alice is allowed to control this specific phone.

2. Simple AD lookup: The ECMA front end reads information in the AD which says Alice is allowed to control this phone.

3. Native AD Authorization: The front end impersonates Alice—i.e. acts on behalf of Alice to read security information from the AD. AD access control lists are setup to allow (or disallow) Alice to read this information. The front end infers that if it is allowed to read the security information (while impersonating Alice) then Alice is allowed to control the phone An exemplary algorithm for authorizing a response to the INVITE request is the following:

Get requester identity from SIP INVITE or INFO "From" header

Get controlled Device ID from CSTA XML message

Notes:
if dynamic device ID is used in a Connection ID then get the associated static device ID If private data (in Request System Status and Get CSTA Features service requests) is not supported then these services are considered as a service that does not include a controlled device ID If CSTA XML does not include a controlled device ID then approve If controlled device ID exist in server flat file and requester is on the list of approved users, (for this device), then approve (Note: this list is used for exceptions, such as Admin users)

Get owner identity, via a reverse lookup using Device ID as a key in (Search AD, Find the User whose msRTCSIP-Line equals "Controlled Device ID", then get the 'msRTCSIP-PrimaryUserAddress' of that User)

If found

If owner identity equal requester identity and msRTC-SIP-OptionFlags (RCC bit-$5^{th}$ bit) is set, (equal 1), then approve else reject else (not found) reject The exemplary algorithm for authorizing a response to the INVITE request may access the line's database, e.g., via LDAP (Lightweight Directory Access Protocol, a standard means of accessing X.500 directories such as AD), or uses the cached store. The key that is used to find the user's lines, in an exemplary embodiment, is the user's LCS identity (SIP URI, such as sip:alice@microsoft.com). If the database is already cached by the application, then it uses the cached store instead. If found, it sends an authorization message (step 6), with a return message from Alice (step 7). The policy as to who can control the line is provisioned in the Active Directory. In order to verify that a requestor can control the line the SIP/ECMA FE accesses the Active Directory to fetch this information. If the authorization passes then it processes the request and send a SIP 200 OK response with an encapsulated ECMA-323 (steps 8-10). Otherwise it sends a SIP 403. The Alice application returns a SIP ACK message (steps 11-13) to the SIP/ECMA server.

Steps 14-19: Soft phone instance application: Alice checks the phone line's capabilities. The soft phone application sends a SIP INFO message with an encapsulated ECMA-323 "Get CSTA Features" (steps 14-16). The PBX ECMA front end 244 sends a SIP 200 OK response with an encapsulated ECMA-323 CSTA features (list of supported services and events) response (steps 17-19). The SIP INFO message is routed within a dialog that has been established by SIP INVITE (steps 3-13). It is routed in the same path (all messages within the dialog traverse through the home server) and authenticated by the home server.

Steps 20-25: Soft phone instance application Alice starts monitoring the PBX phone line. The soft phone application sends a SIP INFO message with an encapsulated ECMA "start monitor" request (steps 20-22). The SIP/ECMA FE 244 authorizes this request (as described above) and sends a SIP 200 OK response with an encapsulated ECMA-323 response (steps 23-25). The Start Monitor request is sent per a specific line (described by device ID in ECMA-323). After Start Monitor response the switching system (the SIP/ECMA FE) starts sending line notifications (events).

Steps 26-36: Application Service Association for instance Alice': The soft phone application for instance of application Alice' 360 sends a SIP INVITE message to each controlled phone's line that includes a Content-Disposition header indicating "signal" and "handling=required" to mandate support for the application/csta+xml MIME type (steps 26-28). An ECMA-323 Request System Status service request is included in the SIP INVITE body with the Content-Type application/csta+xml. A SIP 200 OK response, that includes ECMA-323 Request System Status response, is sent back (steps 31-33). If the PBX SIP/ECMA front end does not support this MIME type, it provides a 415 (Unsupported Media Type) response. A SIP dialog can be rejected due to other failure conditions, such as authorization. In this case an appropriate SIP response error message is sent instead of 200 OK. The soft phone application continues only if it receives a SIP 200 OK with a Request System Status response equal "Normal". Otherwise it closes the SIP dialog and notifies the user that the line cannot be accessed.

Steps 29-30: Authorization (Alice'): The PBX ECMA front end 244 authorizes this request (step 29), e.g. using the algorithm described above. It may access the line's database via LDAP or use its cached database. If the authorization passes (step 30), then it processes the request and sends a SIP 200 OK response with an encapsulated ECMA-323 (steps 31-33). Otherwise it sends a SIP 403. The instance of application returns a SIP ACK message (steps 34-36).

Steps 37-42: Soft phone instance application Alice' checks the phone line's capabilities: The soft phone application sends a SIP INFO message with an encapsulated ECMA-323 "Get CSTA Features" (steps 37-39). The PBX ECMA front end sends a SIP 200 OK response with an encapsulated ECMA-323 CSTA features (list of supported services and events) response 40-42). A SIP INFO message is routed within a dialog that has been established by SIP INVITE. It is routed in the same path (all messages within the dialog traverse through the home server) and authenticated by the home server.

Steps 51-96: Run Time

The PBX ECMA front end reports events that match the subscription request ("monitor start") via SIP INFO messages, e.g. steps 49-51. On the other side of the interface, the soft phone application processes the events and responds to each one with a SIP 200 OK, e.g. steps 52-54.

The soft phone application sends requests for services based on application logic. These requests may trigger new events that are reported as described above. For example, Alice' sends a request for an ANSWER CALL service at steps 61-63. On the other side of the interface the PBX ECMA front end processes these requests and sends responses, e.g. ANSWER CALL APPROVE at steps 64-66. Now Alice' has established a call over the controlled phone line (steps 67-69 and 70-72). Since Alice 330 has also established a SIP dialog for the controlled phone line, the SIP/ECMA server also sends Alice messages regarding the status of the line, including for this example, that the call has been established (steps 73-75), and Alice has returned a SIP OK message (steps 76-78). Now assume that the user at Alice has decided to terminate the call. Alice 330 sends a command to the SIP/ECMA server, SIP INFOR (Clear Connection), steps 79-81. The server responds with a SIP 200 OK (Clear Call Approve) message (steps 82-84), and a SIP INFO (Connection Cleared) message (steps 85-87) and Alice responds with a SIP 200 OK message at steps 88-90. The server sends a SIP INFO (Connection Cleared) message to Alice' at steps 91-93, and Alice' responds with a SIP 200 OK message at steps 94-96.

Of course, the particular request and responses shown in FIG. 4B are merely exemplary; other types of SIP requests may be made and responded to as well. These may include, for example, Start/Stop Monitor, Make Call and Clear Connection services; and Connection Cleared, Failed, Originated, Delivered, Established events. Other services may optionally include, for example, Answer Call, Deflect Call, Single Step Transfer, Hold/Retrieve, Reconnect, Two Steps Transfer Call, Conference Call, DTMF, Forward, and DND. Other events may optionally include Diverted (for Deflect service), Transferred (for Single Step Transfer service), Held Retrieved (for Hold/Retrieved service), Retrieved (for Reconnect service), Held, Retrieved, Transferred (for Consultation Call and Conference services), Forwarding (for Forward service) and Do Not Disturb (For DND service). These are ECMA/CSTA events and services.

Each side (PBX ECMA front end or soft phone application) can gracefully tear down the dialog that is used for sending requests and responses by sending a SIP BYE message. In an exemplary embodiment, the soft phone application sends a Stop Monitor request, using INFO message, before closing the SIP dialog. FIG. 4B illustrates an exemplary set of steps to terminate the dialog, as a result of a Stop Monitor request (steps 97-99) and SIP BYE message (steps 103-105) from instance of application Alice 330. The dialogs are independent; closing the dialog on Alice 330 does not close an open dialog on Alice' 360.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring a common PBX phone line from a plurality of personal computer endpoints, comprising:
   registering for a single user multiple instances of application of a soft phone application respectively running on the plurality of personal computer endpoints, each instance being registered for a common PBX phone line under control of a Session Initiation Protocol (SIP) server;
   a first one of said multiple instances of application establishing a first SIP dialog with said SIP server;
   a second one of said multiple instances of application establishing a second SIP dialog with said SIP server simultaneously with said first SIP dialog;
   monitoring the status of the common PBX phone line simultaneously with said first instance of application and said second instance of application; and
   invoking control services of the PBX phone line from each of said first instances of application and said second instance of application.

2. The method of claim 1, wherein said registering for a single user multiple instances of application of a soft phone application comprises:
   associating a first address of record with a first personal computer device on which a first instance of application of the soft phone application is running;
   associating said first address of record with a second personal computer device on which a second instance of application of the soft phone application is running.

3. The method of claim 1, further comprising:
   hosting said multiple instances of application of said soft phone application on a home server as a SIP user agent, and
   wherein said multiple instances of application of said soft phone application are registered on the home server.

4. The method of claim 1, wherein said establishing a first SIP dialog comprises:
   sending out a SIP INVITE message to the SIP server from a first one of the multiple instances of application requesting system status data;
   on receipt of a successful response to said SIP INVITE message, sending from the first one of the multiple instances of application one or more SIP INFO messages to get the status of the common phone line and to register for events with the SIP server;
   sending from the first one of the multiple instances of application a subsequent command as a SIP INFO message with an ECMA command encoded as XML carried in the message body of the INFO message.

5. The method of claim 1 wherein said monitoring the status of the PBX phone line comprises:

sending a SIP message with PBX phone line state information from the SIP server to each instance of application so that each instance of application has the same view of the phone line state.

6. The method of claim 1 wherein said invoking control services of the PBX phone line from each of said first instances of application and said second instance of application comprises sending SIP INFO messages with ECMA commands embedded therein.

7. The method of claim 6, wherein said invoking control services of the PBX phone line comprises:
sending a SIP INFO message with a command to answer a call on the phone line embedded therein from the first instance of application to the SIP server;
sending a SIP INFO with a command to clear a connection on the phone line embedded therein from the second instance of application to the SIP server.

8. The method of claim 1, further comprising:
sending a SIP message from said first one of said multiple instances of application to said SIP server to close said first SIP dialog without closing said second SIP dialog.

9. A method for monitoring and controlling a common PBX phone line controlled by an ECMA switching system with multiple instances of application of a SIP UA soft phone application hosted by a home server, comprising:
registering for a single user multiple instances of application of the SIP UA soft phone application on the home server, each instance being assigned a common phone line under control of the ECMA switching system;
sending out a SIP INVITE message to the ECMA switching system from a first one of the multiple instances of application requesting system status data;
on successful response, sending from the first one of the multiple instances of application one or more SIP INFO messages to get the status of the common phone line and to register for events with the ECMA switching system;
sending from the first one of the multiple instances of application subsequent commands as SIP INFO messages each with an ECMA command carried in the message body of the INFO message;
sending out a SIP INVITE message to the ECMA switching system from a second one of the multiple instances of application requesting system status data;
on successful response, sending from the second one of the multiple instances of application one or more SIP INFO messages to get the status of the common phone line and to register for events with the ECMA switching system simultaneously with said first instance of application;
sending from the second one of the multiple instances of application subsequent commands as SIP INFO messages each with an ECMA command carried in the message body of the INFO message.

10. The method of claim 9, wherein said ECMA commands include commands to change the state of the phone line, the method further comprising:
sending a SIP INFO message from the ECMA switching system to each of the soft phone instances of application currently having a connected INVITE session with the ECMA switching system for monitoring the phone line.

11. The method of claim 9, wherein said first one of the multiple instances of application is running on a personal computer device.

12. The method of claim 9, wherein said second one of the multiple instances of application is running on a laptop computer device.

13. The method of claim 9, wherein each instance of application is assigned a different contact address by the home server.

14. A method for monitoring and controlling a common PBX phone line from a plurality of personal computer endpoints, comprising:
registering for a single user first and second instances of application of a soft phone application running on first and second personal computer endpoints, each instance being registered for a common PBX phone line under control of a PBX switching system server using Session Initiation Protocol (SIP);
said first instance of application establishing a first SIP dialog with said PBX switching system server;
said second instance of application establishing a second SIP dialog with said PBX switching server;
monitoring the status of the common PBX phone line simultaneously with said first instance of application and said second instance of application; and
invoking control services of the PBX phone line from each of said first instances of application and said second instance of application.

15. The method of claim 14, further comprising:
hosting said first and second instances of application of said soft phone application on a home server as a SIP user agent, and
wherein said first and second instances of application of said soft phone application are registered on the home server.

16. The method of claim 14, wherein said establishing a first SIP dialog comprises:
sending out a SIP INVITE message to the PBX switching system server from said first instance of application requesting system status data;
on receipt of a successful response to said SIP INVITE message, sending from the first instance of application one or more SIP INFO messages to get the status of the common phone line and to register for events with the PBX switching server;
sending from the first instance of application a subsequent command as a SIP INFO message with an ECMA command carried in the message body of the INFO message.

17. The method of claim 14 wherein said monitoring the status of the PBX phone line comprises:
sending a SIP message with PBX phone line state information from the PBX switching system server to each of said first and second instances of application so that each instance of application has the same view of the phone line state.

18. The method of claim 14 wherein said invoking control services of the PBX phone line from each of said first instances of application and said second instance of application comprises sending SIP INFO messages with ECMA commands embedded therein.

19. The method of claim 18, wherein said invoking control services of the PBX phone line comprises:
sending a SIP INFO message with a command to answer a call on the phone line embedded therein from the first instance of application to the PBX switching system server;
sending a SIP INFO with a command to clear a connection on the phone line embedded therein from the second instance of application to the PBX switching system server.

20. The method of claim 14, further comprising:
sending a SIP message from said first instance of application to said PBX switching system server to close said first SIP dialog without closing said second SIP dialog.

* * * * *